(12) United States Patent
Toyoshima et al.

(10) Patent No.: US 6,298,349 B1
(45) Date of Patent: Oct. 2, 2001

(54) SYSTEM RESOURCE DISPLAY APPARATUS AND METHOD THEREOF

(75) Inventors: Hirobumi Toyoshima, Yamato; Sugio Ishii, Komae; Yasuhide Niimura, Yokohama; Kazuhito Akiyama, Machida, all of (JP)

(73) Assignee: International Business Machines Corp., Armonk, NY (US)

( * ) Notice: Subject to any disclaimer, the term of this patent is extended or adjusted under 35 U.S.C. 154(b) by 0 days.

(21) Appl. No.: 09/136,338

(22) Filed: Aug. 19, 1998

(30) Foreign Application Priority Data

Aug. 20, 1997 (JP) .................................................. 9-223414

(51) Int. Cl.$^7$ ...................................................... G06F 17/30
(52) U.S. Cl. .............................. 707/100; 707/3; 345/356; 709/223
(58) Field of Search .............................. 707/4, 103, 100; 345/356; 709/223

(56) References Cited

U.S. PATENT DOCUMENTS

| | | | |
|---|---|---|---|
| 5,566,346 | * 10/1996 | Andert et al. | 395/828 |
| 5,675,748 | * 10/1997 | Ross | 395/284 |
| 5,829,003 | * 10/1998 | Okura | 707/100 |
| 5,844,553 | * 12/1998 | Hao et al. | 345/329 |
| 5,953,724 | * 9/1999 | Lowry | 707/102 |
| 5,970,486 | * 10/1999 | Yoshida et al. | 707/4 |
| 6,003,040 | * 12/1999 | Mital et al. | 707/103 |
| 6,023,572 | * 2/2000 | Lautzenheiser | 395/500.23 |
| 6,028,602 | * 2/2000 | Weidenfeller et al. | 345/340 |
| 6,061,709 | * 5/2000 | Bronte | 709/103 |
| 6,072,493 | * 6/2000 | Driskell et al. | 345/356 |
| 6,108,712 | * 8/2000 | Hayes, Jr. | 709/246 |

\* cited by examiner

Primary Examiner—Jack Choules
Assistant Examiner—Cheryl Lewis
(74) Attorney, Agent, or Firm—David M. Shofi; Anne Vachon Dougherty

(57) ABSTRACT

A network system 1 transmits data between a management apparatus 2 and managed devices 3 each connected to a communication network, processes the data, and displays resources of the managed devices 3 in association with users and/or organizations of the managed devices 3, thereby to support system management operations. That is, in the network system 1, the management apparatus 2 displays an organizational map in a tree form that shows employee numbers of users who belong to each subordinate organization (division/section) that makes use of the system in association with an identifier of such a subordinate organization, displays users who belong to a designated subordinate organization in association with the users' managed devices 3, displays resources of a designated managed device 3, and causes the designated managed device 3 to execute a process using its resources.

27 Claims, 8 Drawing Sheets

SYSTEM RESOURCE DISPLAY APPARATUS AND METHOD THEREOF

FIELD OF THE INVENTION

This invention relates to a system resource display apparatus and a method for use in a network system, comprising a plurality of devices such as computers or the like connected via a network, for managing and displaying hardware and/or software resources of each of the devices.

BACKGROUND OF THE INVENTION

A network system, comprising a plurality of computers connected via a network, has been used in the art to perform data processing, data transfers and the like. In general, system management operations in such a system have been performed by associating information unique to devices (constituents of the system) with users of the devices and organizational groups (e.g., subordinate organizations in a business organization) that possess the devices.

For example, Japanese Patent Publications, identified in Japanese as Tokkai sho 63-114337, Tokkai hei 4-79446, Tokko hei 1-16066 and Tokko hei 7-44541 (References 1 to 4), disclose electronic mail schemes and data transfer schemes, each exploiting such a network system. However, these References merely disclose methods for associating destinations and routes of mails (data) with subordinate organizations of users and names thereof. In other words, none of the References discloses a method of displaying hardware and/or software resources of each of the devices in association with a user and a subordinate organization thereof.

In view of the aforementioned problems of the prior art, it is an object of this invention to provide a system resource display apparatus and a method for use in a network system, comprising a plurality of devices such as computers or the like connected via a network, which are arranged to display information relating to hardware and/or software resources of each of the devices in association with users and organizational groups that possess the devices.

It is another object of this invention to provide a system resource display apparatus and a method, which are arranged to display information relating to hardware and/or software resources of each of the devices (constituents of a network system), thereby to facilitate system management operations and simultaneously to reduce system administrator's efforts required therefor.

SUMMARY OF THE INVENTION

In order to accomplish said objects of this invention, there is provided a first system resource display apparatus for use in a system including one or more managed devices. Said first system resource display apparatus is arranged to display resources of each of said managed devices, and it comprises an information database for storing certain information data items arranged in a hierarchy, each information data item including a certain keyword data item; a resource database for storing resource data items, each indicating resources of each of said managed devices and said keyword data items in association with each of said resource data items; hierarchy display means for displaying one or more hierarchical levels of said information data items stored in said information database; information data display means, being responsive to an action of designating one of said displayed hierarchical levels, for displaying said information data items included in said designated hierarchical level; and resource data display means, being responsive to an action of designating one of said displayed information data items, for displaying one of said resource data items that is stored in said resource database in association with one of said keyword data items included in said designated information data item.

Further, in accordance with another aspect of this invention, there is provided a second system resource display apparatus for use in a system including one or more managed devices, wherein said managed devices and said second system resource display apparatus communicate with each other via a network, each of said managed devices having a unique resource data item and a certain keyword data item assigned thereto, and each of said managed devices being responsive to a retrieval operation via said network for returning said assigned resource data item and keyword data item. Said second system resource display apparatus is arranged to display resources of each of said managed devices, and it comprises: an information database for storing certain information data items arranged in a hierarchy, each information data item including a certain keyword data item; a resource database for storing said managed devices and said keyword data items in association with each of said managed devices; hierarchy display means for displaying one or more hierarchical levels of said information data items stored in said information database; information data display means, being responsive to an action of designating one of said displayed hierarchical levels, for displaying said information data items included in said designated hierarchical level; managed device display means, being responsive to an action of designating one of said displayed information data items, for displaying one of said managed devices that is stored in said resource database in association with one of said keyword data items included in said designated information data item; and resource data display means, being responsive to an action of designating one of said managed devices, for retrieving said designated managed device via said network, and for displaying said resource data item returned from said retrieved managed device.

Preferably, said managed devices and said first or second system resource display apparatus communicate with each other via a network, and said first or second system resource display apparatus comprises: setup acceptance means for accepting a change to said displayed resource data item; and setup transmission means for transmitting said accepted change of said displayed resource data item to said designated managed device via said network; whereby said designated managed device adapts settings of its resources in line with said accepted change to said displayed resource data item received via said network.

Preferably, said first or second system resource display apparatus comprises: setup acceptance means for accepting a change to said displayed resource data item; whereby said resource database updates content of said displayed resource data item in line with said accepted change to said displayed resource data item.

Said information data item indicates an information item relating to a user of said managed device, said keyword data item is indicates a user of said managed device, and said resource data item indicates a hardware information item and/or a software information item relating to said managed device.

In a typical network system for use in a business organization where a plurality of computers (managed devices) are connected via a network, said first or second system resource display apparatus of this invention is arranged to display information relating to hardware and/or software resources of each of the computers in association with a subordinate organization and the computer's user (member of such a subordinate organization).

Further, in this network system, each of the computers has a resource data item (indicating its unique software and/or hardware resources) and a keyword data item (indicating a user such as his/her employee number or the like) assigned thereto, and each of the computers is responsive to a request from said first or second system resource display apparatus via said network for returning said assigned resource data item and keyword data item to said first or second system resource display apparatus via said network.

In said first system resource display apparatus of this invention, said information database stores, for example, an information item relating to each user in association with his/her subordinate organization. That is, for each of those subordinate organizations that makes use of the network system, said information database arranges personnel information data (information data items), including employee numbers of users that are used as keywords in executing a database retrieval operation, into a hierarchy and then stores the hierarchical personnel information data for management therein.

On the other hand, said resource database stores resource data items, each indicating hardware and/or software resources of each of the computers in the network system, in association with each keyword data item (e.g., employee number of user) included in the personnel information data stored in said information database.

Said hierarchy display means arranges subordinate organizations included in the personnel information data stored in said information database into a hierarchy, and then displays the hierarchical subordinate organizations. For example, based on the personnel information data stored in said information database, said hierarchy display means arranges a hierarchy of business organization to headquarters, a sales division, a general affairs division and an accountants' division in the headquarters, and to each section in each of the divisions, and then displays these hierarchized subordinate organizations in a tree form.

Said information data display means is responsive to selection (for example, by the clicking of a mouse) of one of the subordinate organizations displayed by said hierarchy display means in a tree form for retrieving said information database, acquiring personnel information data belonging to the designated subordinate organization, and displaying users' names or the like included in the acquired personnel information data.

Said resource data display means is responsive to selection (for example, by the clicking of a mouse) of one of the users' names displayed by said information data display means for retrieving said resource database by using employee number or the like (keyword) included in personnel information data of the selected user, and displaying a resource data item obtained as a result of the retrieval, i.e., software and/or hardware resources of the selected user's computer.

In said second system resource display apparatus of this invention, said managed device display means is responsive, for example, to selection of one of the users' names displayed by said information data display means for retrieving said resource database by using employee number or the like (keyword) included in personnel information data of the selected user, and displaying a list of the selected user's computers.

Said resource data display means is responsive, for example, to selection (e.g., by the clicking of a mouse) of one of the computers displayed by said managed device display means for interrogating the selected computer via a network about hardware and/or software resources, receiving a resource data item returned from the selected computer in response to this interrogation, and displaying a list of the selected computer's resources.

Further, in accordance with another aspect of this invention, there is provided a first system resource display method for use in a system including one or more managed devices. Said first system resource display method is arranged to display resources of each of said managed devices, and it comprises the steps of: storing certain hierarchical information data items, each including a certain keyword data item; storing resource data items, each indicating resources of each of said managed devices, and storing each of said keyword data items in association with each of said resource data items; displaying one or more hierarchical levels of said information data items; responding to an action of designating one of said displayed hierarchical levels, for displaying said information data items included in said designated hierarchical level; and responding to an action of designating one of said displayed information data items, for displaying one of said resource data items that is stored in said resource database in association with one of said keyword data items included in said designated information data item.

Further, in accordance with another aspect of this invention, there is provided a second system resource display method, for use in a system resource display apparatus in a system including one or more managed devices, for displaying resources of each of said managed devices wherein said managed devices and said system resource display apparatus communicate with each other via a network, each of said managed devices having a unique resource data item and a certain keyword data item assigned thereto, and each of said managed devices being responsive to a retrieval operation via said network for returning said assigned resource data item and keyword data item. Said second system resource display method is arranged to display resources of each of said managed devices, and it comprises the steps of: storing certain information data items arranged in a hierarchy, each information data item including a certain keyword data item; storing said managed devices and said keyword data items in association with each of said managed devices; displaying one or more hierarchical levels of said information data items; responding to an action of designating (i.e., selecting) one of said displayed hierarchical levels, for displaying said information data items included in said designated hierarchical level; responding to an action of designating one of said displayed information data items, for displaying one of said managed devices that is stored in association with one of said keyword data items included in said designated information data item; and responding to an action of designating one of said displayed managed devices, for retrieving said designated managed device via said network, and for displaying said resource data item returned from said retrieved managed device.

Further, in accordance with another aspect of this invention, there is provided a first machine readable storage medium for storing software adapted for use in system resource display apparatus in a system including one or more managed devices for displaying resources of each of said managed devices. Said software is executable by a computer for causing said system resource display apparatus to carry out machine-effected steps of: storing certain information data items arranged in a hierarchy, each information data item including a certain keyword data item; storing resource data items, each indicating resources of each of said managed devices, and storing each of said keyword data items in association with each of said resource data items; displaying one or more hierarchical levels of said information data items; responding to an action of designating (i.e., selecting) one of said displayed hierarchical levels, for displaying said information data items included in said designated hierarchical level; and, responding to an action of designating one of said displayed information data items, for displaying one of said resource data items that is stored in said resource database in association with one of said keyword data items included in said designated information data item.

Further, in accordance with another aspect of this invention, there is provided a second machine readable storage medium for storing software adapted for use in a system resource display apparatus in a system including one or more managed devices for displaying resources of each of said managed devices, wherein said managed devices and said system resource display apparatus communicate with each other via a network, each of said managed devices having a unique resource data item and a certain keyword data item assigned thereto, and each of said managed devices being responsive to a retrieval operation via said network for returning said assigned resource data item and keyword data item. Said software is executable by a computer for causing said system resource display apparatus to carry out the machine-effected steps of: storing certain information data items arranged in a hierarchy, each information data item including a certain keyword data item; storing said managed devices and said keyword data items in association with each of said managed devices; displaying one or more hierarchical levels of said information data items; responding to an action of designating (i.e., selecting) one of said displayed hierarchical levels, for displaying said information data items included in said designated hierarchical level; responding to an action of designating one of said displayed information data items, for displaying one of said managed devices that is stored in association with one of said keyword data items included in said designated information data item; and responding to an action of designating one of said managed devices, for retrieving said designated managed device via said network, and for displaying said resource data item returned from said retrieved managed device.

BRIEF DESCRIPTION OF THE DRAWINGS

The invention will now be described in greater detail with specific reference to the appended drawings wherein.

DESCRIPTION OF THE PREFERRED EMBODIMENT

Figure 1:
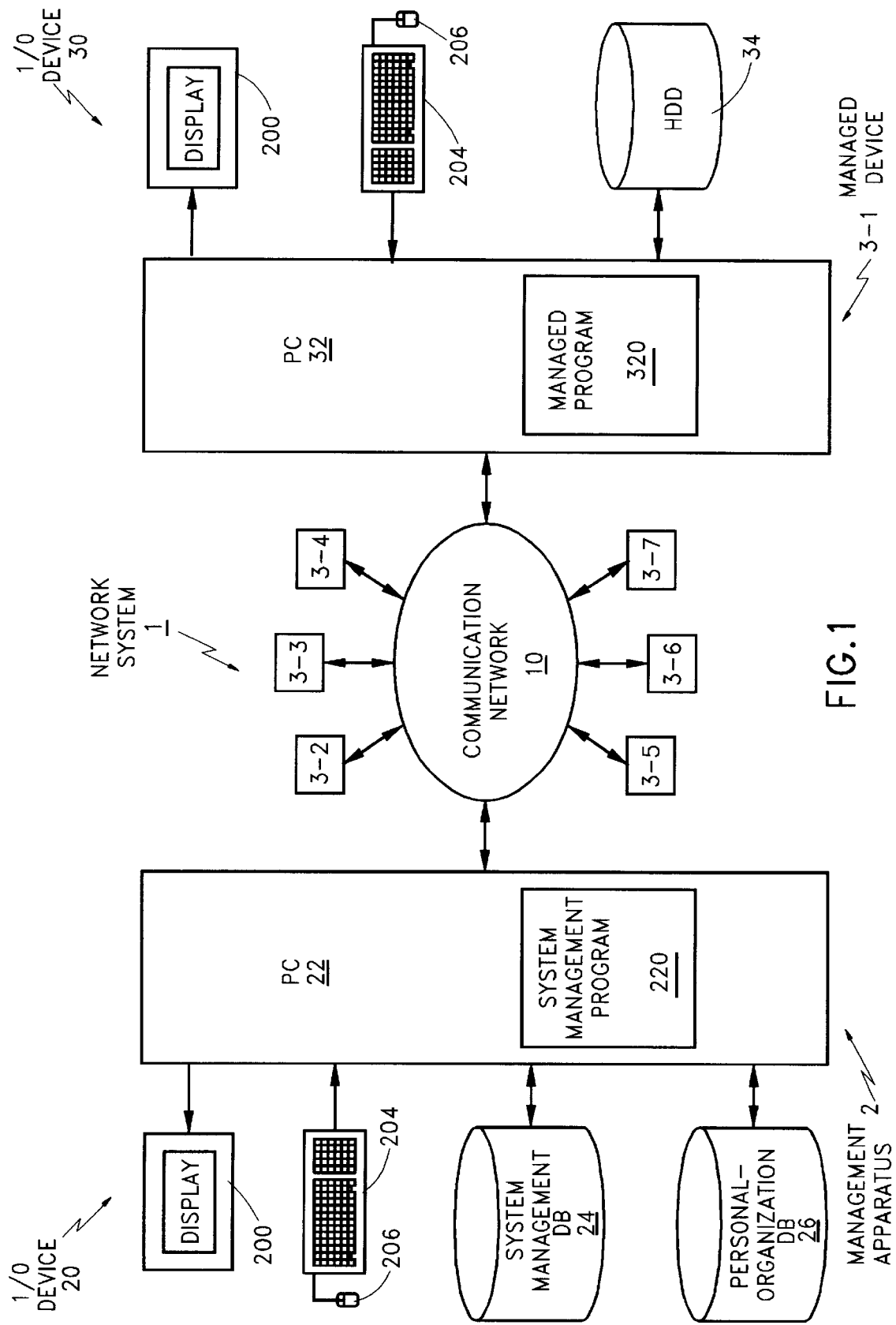
FIG. 1 is a diagram illustrating a network system wherein a network resource display method of this invention may be applied.

FIG. 1 shows a network system 1, wherein a network resource display method of this invention may be applied. As shown in FIG. 1, the network system 1 comprises k management apparatuses 2 (FIG. 1 illustrates a case of k=1), managed devices 3-1 to 3-m (FIG. 1 illustrates a case of m=7; however, hereinbelow, when an arbitrary one of the managed devices 3-1 to 3-m is referred to, it will be simply called "managed device 3" in singular or plural form, as the case may be), and a communication network 10 such as a data communication network, an ISDN network or a LAN network, which is capable of supporting data communication (without distinction of protocols).

For the sake of simplicity of the drawing, there is shown in FIG. 1 a system management program 220 and a managed program 320 only as programs executable on the management apparatus 2 and the managed devices 3. Note, however, that different application programs are executable on the management apparatus 2 and the managed devices 3, as described below with reference to FIGS. 2 and 6.

The network system 1, with these constituents, transmits data between the management apparatus 2 and the managed devices 3, processes such data, and displays information relating to hardware resources of each of the managed devices 3 in association with users of the managed devices 3 and/or the users' subordinate organizations, thereby to support management operations of the network system 1.

The management apparatus 2 comprises, for example, a display device 200 such as a CRT display or the like, an input/output device 20 having an input device including a keyboard 204 and a mouse 20 for accepting a system administrator's action, a computer 22 having data communication functions and executing the system management program 220 and the like, a system management database (SM-DB) 24 and a personnel-organization database (PO-DB) 26. Note that, in the management apparatus 2, the system management database 24 and the personnel-organization database 26 may be implemented by using hardware other than the computer 22, or they is may be implemented as software that uses resources of the computer 22.

<System Management Program 220>

Figure 2:
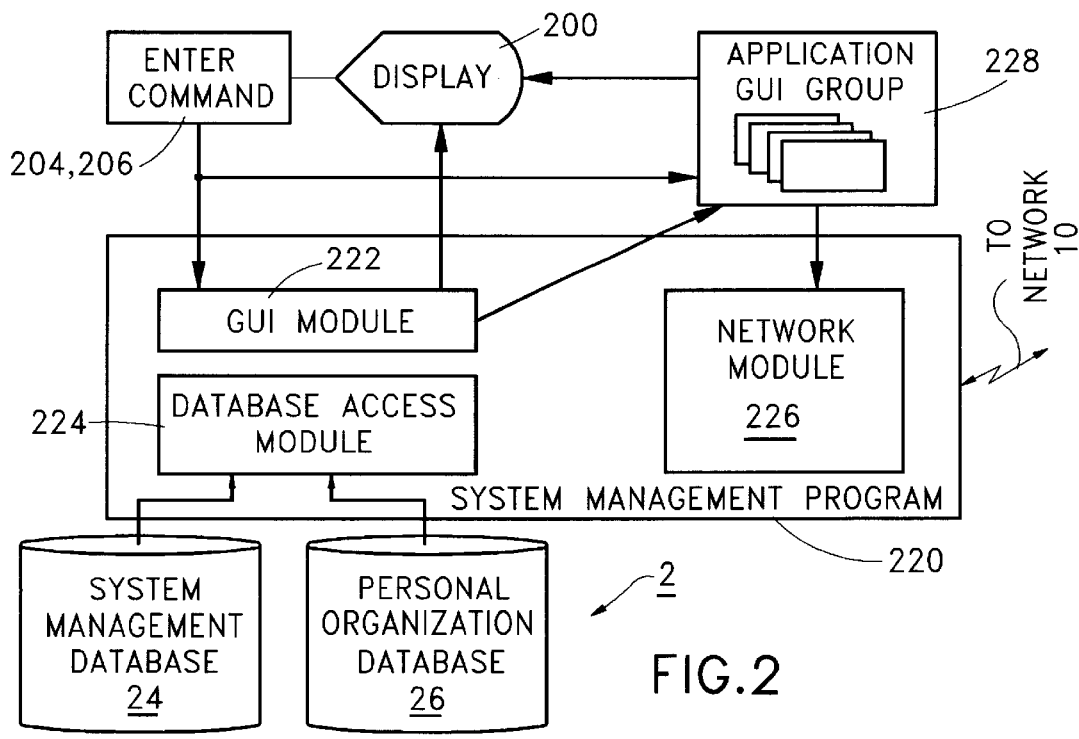
FIG. 2 is a diagram illustrating a configuration of a system management program of the management apparatus shown in FIG. 1.

FIG. 2 shows a configuration of the system management program 220 shown in FIG. 1. As shown in FIG. 2, the system management program 220 comprises a GUI (Graphical User Interface) module 222, a database access module 224, and a network module 226. The computer 22 further comprises a plurality of application GUIs 228.

<GUI Module 222>

The GUI module 222 starts a given one of the GUIs 228, and outputs information of the managed devices 3 to this GUI 228. Further, the GUI module 222 displays data inputted from the database access module 224 on the display device 200. Further, the GUI module 222 outputs data, which is entered by a system administrator via the keyboard 204 or the like, to the database access module 224 and a given one of the GUIs 228.

<Database Access Module 224>

Figure 3:
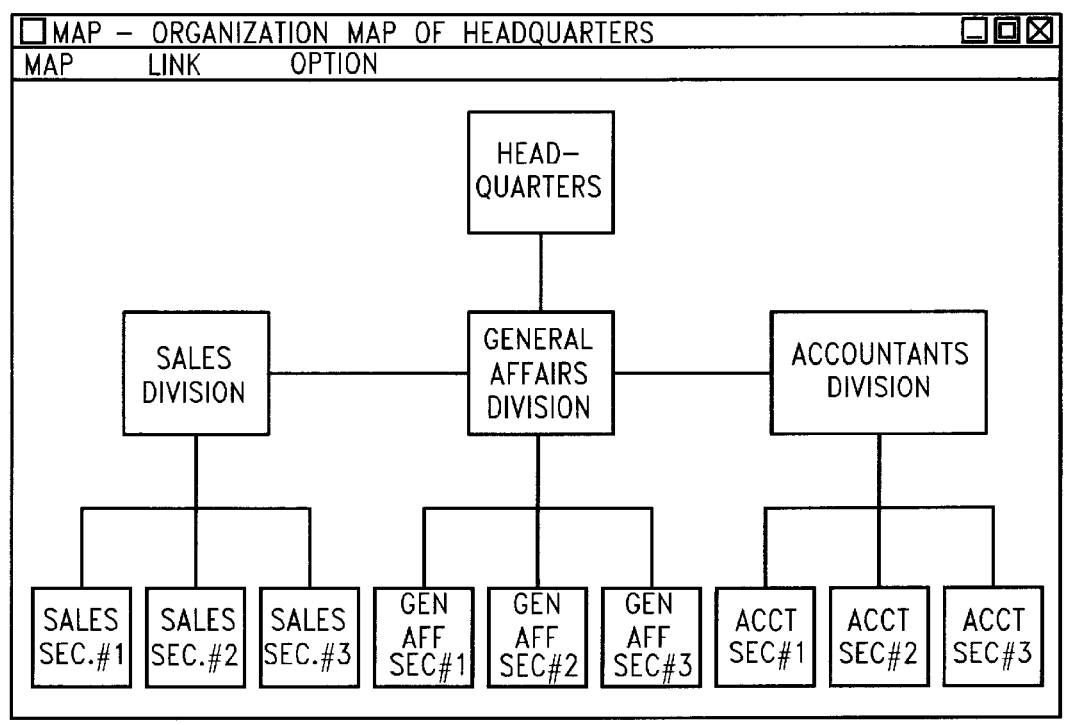
FIG. 3 is a diagram illustrating an image displayed on a display device in accordance with an organization display function of the system management program shown in FIGS. 1 and 2.
Figure 4:
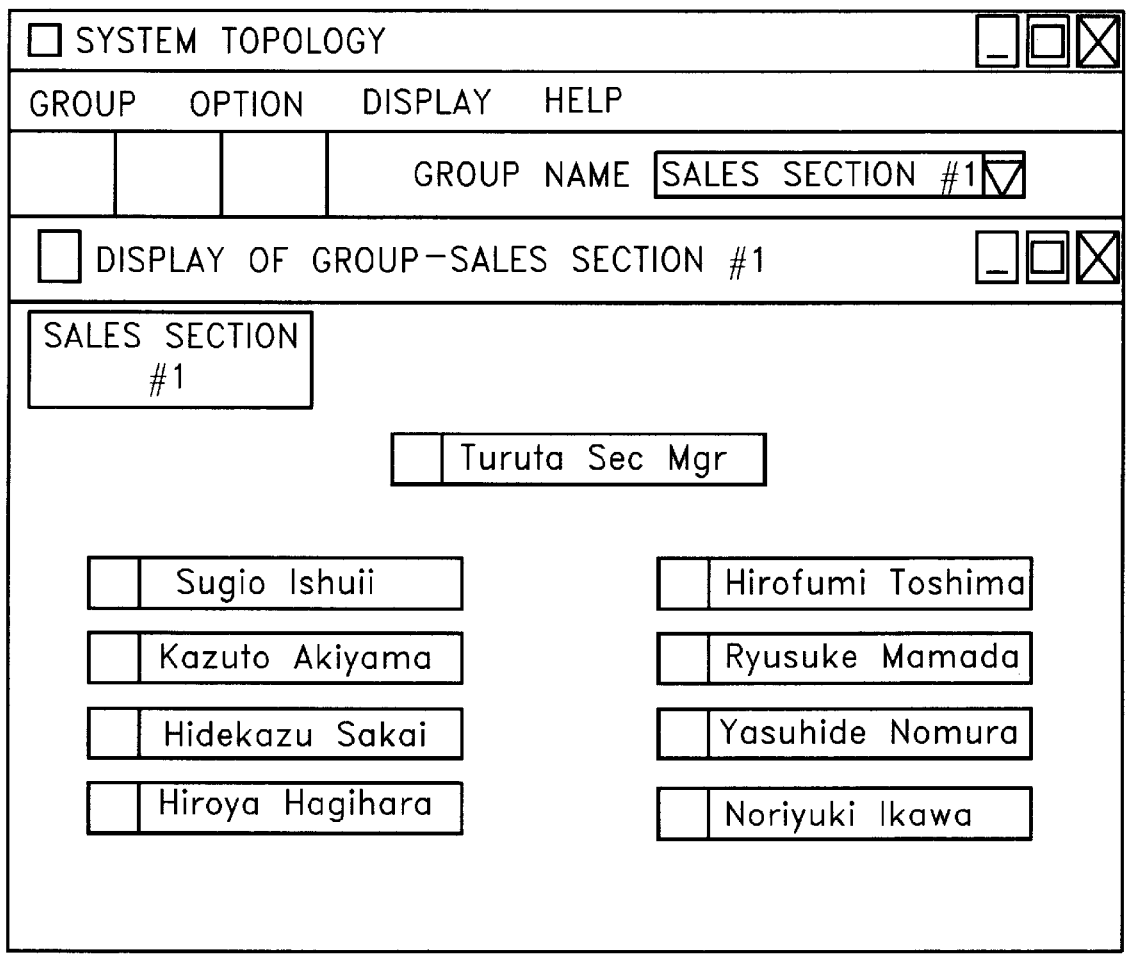
FIG. 4 is a diagram illustrating an image displayed on a display device in accordance with a group display function of the system management program shown in FIGS. 1 and 2.
Figure 5:
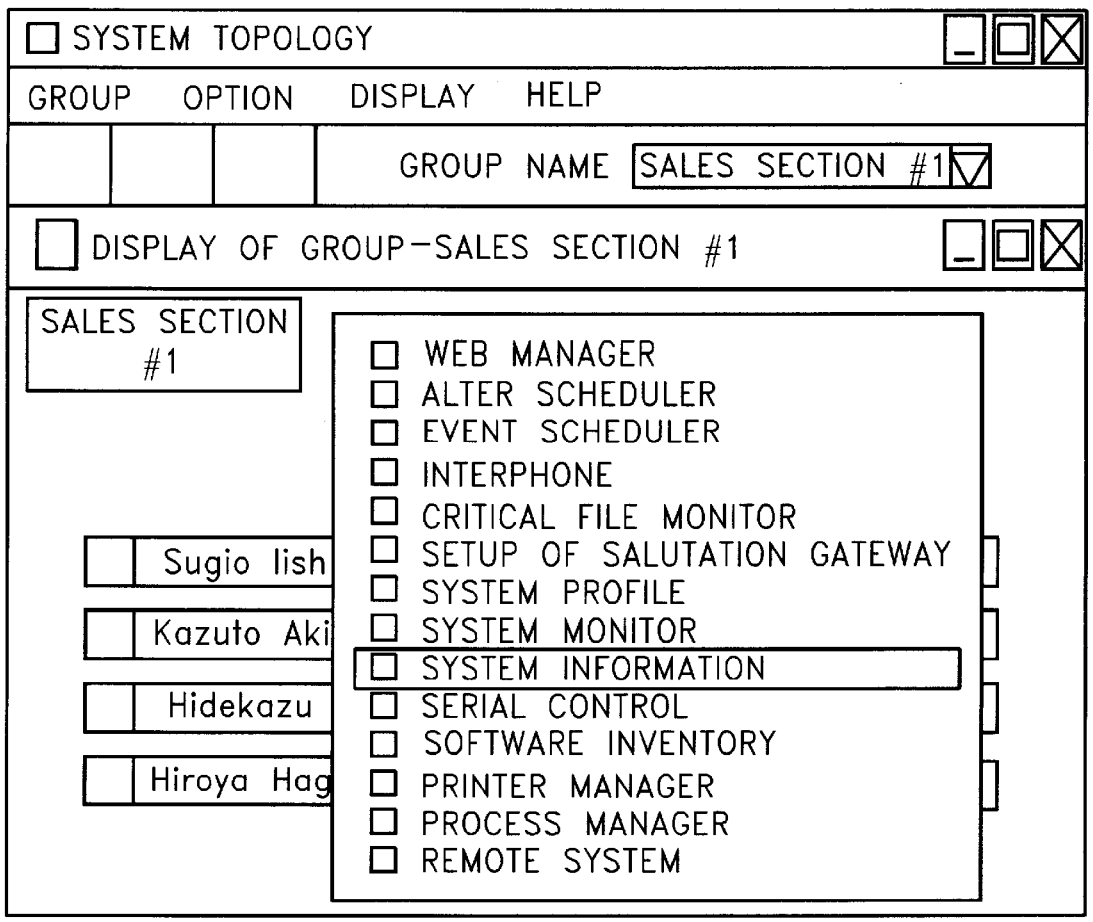
FIG. 5 is a diagram illustrating an image displayed on a display device in accordance with a list display function of the system management program shown in FIGS. 1 and 2.

The database access module 224 responds to a system administrator's action accepted by the GUI module 222 for controlling the personnel-organization database (PO-DB) 26 and the system management database (SM-DB) 24 separately or in an interlocked manner, stores "personnel information data" and "device data" that are inputted from the GUI module 222 into the personnel-organization database (PO-DB) 26 and the system management database (SM-DB) 24 for management therein, and performs various functions such as organization display function, group display function, list display function and the like, as described below with reference to FIGS. 3 to 5.

Note here that said "personnel information data" includes subordinate organizations in a business organization that use the network system 1, structures of the subordinate organizations, names and employee numbers of users who belong to each of the subordinate organizations, and the like. Note further that said "device data" includes information unique to the managed devices 3 such as manufacturer's serial numbers (serial numbers), device names, network addresses, memory amounts, and the like, as well as additional data such as employee numbers of users who use the managed devices 3, users' contact points, organizational numbers of subordinate organizations to which users belong, and the like.

<Network Module 226>

The network module 226 transmits data between the management apparatus 2 and the managed devices 3.

<GUIs 228>

A given one of the GUIs 228 outputs GUI image data for operating software of the managed devices 3 to the display device 200, and outputs data that is entered via the keyboard 204 or the mouse 206 for indicating system administrators' actions with respect to a GUI image to the network module 226. Further, this GUI 228 receives an executed result of either one of the applications programs 330 from the managed devices 3, and displays such result on the display device 200.

Now, functions of the system management program 220 will be described.

<Organization Display Function>

FIG. 3 is a drawing illustrating an image displayed on the display device 200 in accordance with the organization display function of the system management program 220 shown in FIGS. 1 and 2. For each of subordinate organizations (e.g., divisions/sections in a business organization) which is arranged in a hierarchy and that uses the network system 1, the system management program 220 stores names and identifiers (employee numbers) of employees (users) who belong to this subordinate organization into the personnel-organization database 26 in association with an identifier of this subordinate organization for management therein. Further, the system management program 220 arranges a hierarchy of data stored in the personnel-organization database 26 for each of the subordinate organizations, and displays the hierarchical data on the display device 200 as an organizational map in a tree form, for example, as illustrated in FIG. 3 (Organization Display Function). Hereinbelow, such data stored into the personnel-organization database 26 and managed therein will be collectively called "personnel information data".

<Group Display Function>

FIG. 4 is a drawing illustrating an image displayed on the display device 200 in accordance with the group display function of the system management program 220 shown in FIGS. 1 and 2. Where the system management database 24 and the personnel-organization database 26 are operated in an interlocked manner, and where given subordinate organizations are displayed on the display device 200 in accordance with the organization display function, the system management program 200 responds to system administrator designation (i.e., selection) of either one of the displayed subordinate organizations, which may be done by clicking of the mouse 206, for displaying users (employees) who belong to the designated subordinate organization, as shown in FIG. 4, in association with the managed devices 3 of these users in the form of icons (Group Display Function).

In the group display image shown in FIG. 4, icons of each user and his/her managed device 3 may be moved to another location through a drag-and-drop action (i.e., action done by a system administrator who clicks an icon using the mouse 206, moves the icon with the mouse's button depressed, and releases the button at a desired location). Further, a bit map image may be placed in the background, for example.

<List Display Function>

FIG. 5 is a drawing illustrating an image displayed on the display device 200 in accordance with the list display function of the system management program 220 shown in FIGS. 1 and 2. Where either one of the managed devices 3, displayed on the display device 200 in accordance with the group display function, is designated by a system administrator who clicks the mouse 206, the system management program 200 requests the designated managed device 3 via the communication network 10 to transmit resource data that indicates software and/or hardware resources possessed by the designated managed device 3 (i.e., an application list to be described below and such data indicating another resource of the designated managed device 3), and displays the resource data transmitted from this managed device 3 in response to the request in the form of listed icons, as shown in FIG. 5 (List Display Function).

<Remote Control Function>

Where a system administrator of the management apparatus 2 designates (i.e., selects by clicking the mouse 206) either one of the resources that are displayed on the list display screen shown in FIG. 5, the system management program 200 requests the associated managed device 3 via the communication network 10 to execute a process that uses the designated hardware (e.g., one or more resources 340 shown in FIG. 6), a setup process for the designated hardware and/or the designated software (e.g., one or more application programs 330 shown in FIG. 6), and displays on the display device 200 the executed results returned from the associated managed device 3 that has executed the involved software in response to the request (Remote Control Function).

<Managed Device 3>

Similar to the management apparatus 2, each of the managed devices 3 comprises, for example, a display device 200, an input/output device 30 having an input device including a keyboard 204 and a mouse 206 or the like, a computer 32 having data communication functions and executing the managed program 320, and a hard disk drive 34.

<Managed Program 320>

Figure 6:
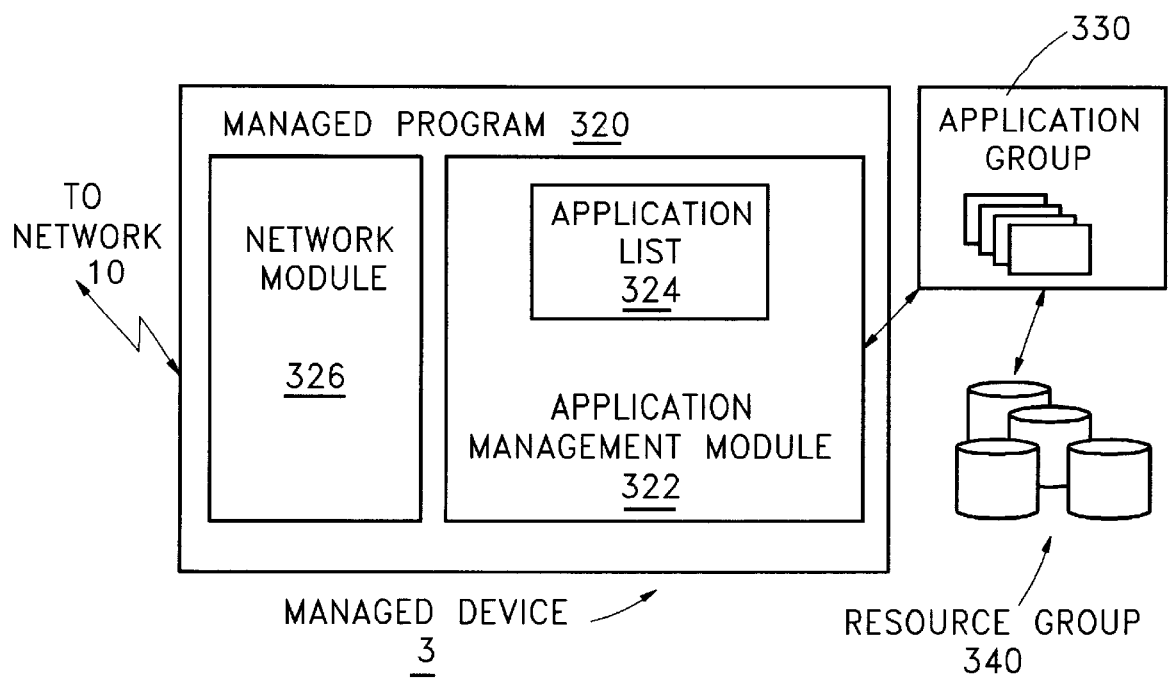
FIG. 6 is a diagram illustrating a configuration of the managed program executable on each of the managed devices shown in FIG. 1.

FIG. 6 is a drawing illustrating a configuration of the managed program 320 executable on each of the managed devices 3. As shown in FIG. 6, the managed program 320 comprises an application management module 322, including an application list 324, and a network module 326. The computer 32 further comprises a plurality of application programs 330 and a plurality of resources 340, including files, processes, screens, data, hardware of the managed device 3 and the like, which are settable and manipulable from the management apparatus 2.

<Application Management Module 322>

The application management module 322 manages the application programs 330 and the resources 340, creates and stores the application list 324 indicating hardware and/or software resources is possessed by the computer 32, and responds to a request from the network module 326 for outputting the application list 324 to the network module 326.

Further, the application management module 322 responds to a resource designation inputted from the network module 326 for executing a process using either one of the designated resources 340, a setup process for the resources 340 or either one of the designated application program 330, and outputs the executed result to the network module 326.

<Network Module 326>

The network module 326 transmits data between the management apparatus 2 and the associated managed device 3. Further, upon receipt of a transmission request for resource data from the management apparatus 2, the network module 326 requests the application management module 322 to provide the application list 324, and then transmits the application list 324, so provided from the application management module 322, to the management apparatus 2 as resource data.

Further, the network module 326 accepts a resource designation from the management apparatus 2, outputs the same to the application management module 322, and transmits the results of a process, which has been executed by using the designated resource and inputted from the application management module 322, to the management apparatus 2.

<Operations of Network System 1>

Now, operations of the network system 1 will be described.

<Operations of Management Apparatus 2>

Figure 8:
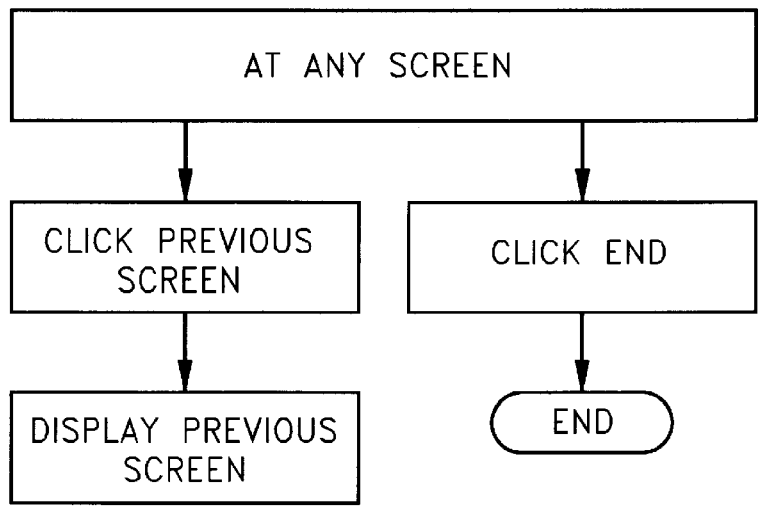
FIG. 8 is a second flow chart illustrating operations of the system management program shown in FIGS. 1 and 2.
Figure 7:
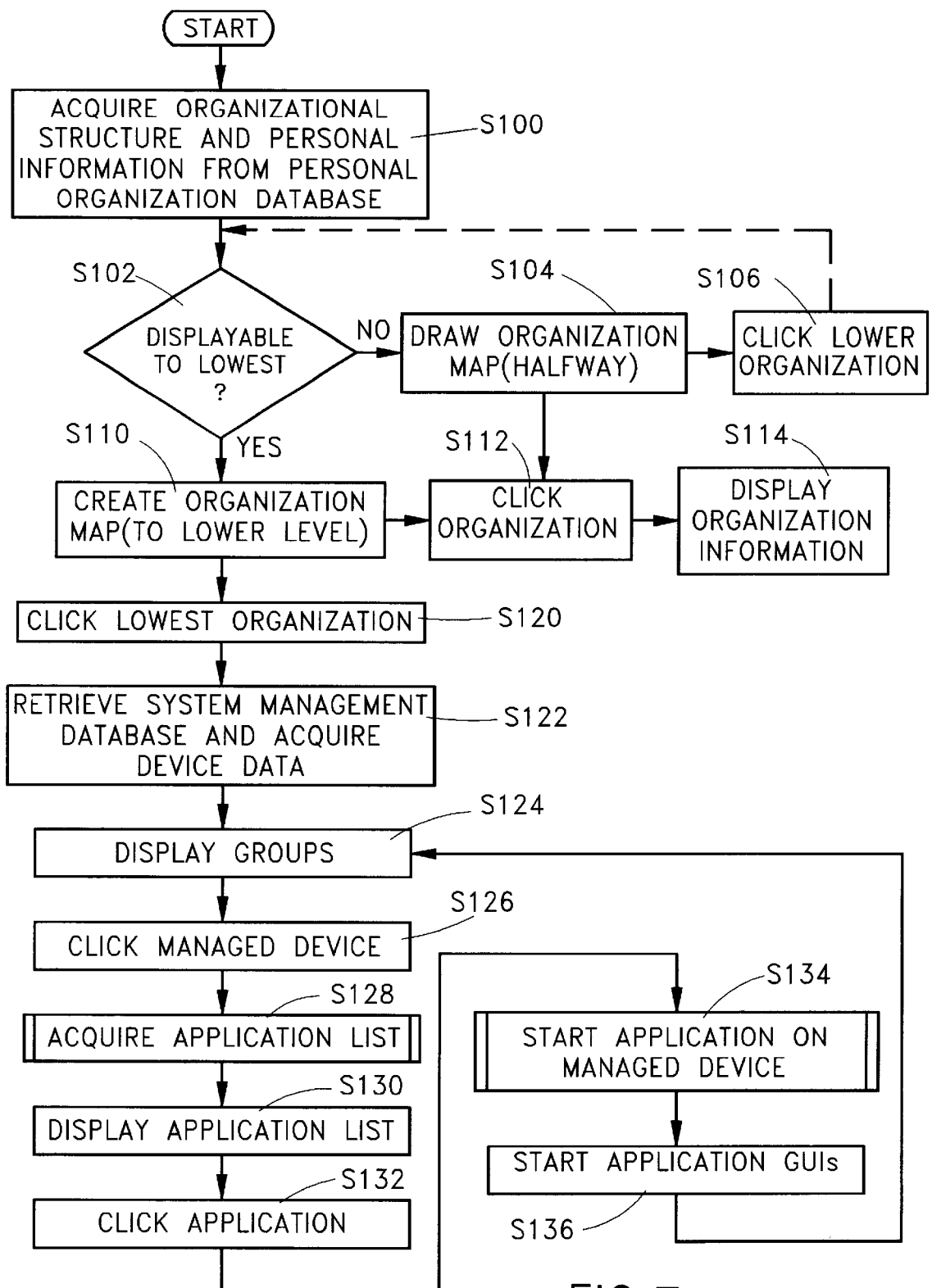
FIG. 7 is a first flow chart illustrating operations of the system management program shown in FIGS. 1 and 2.
Figure 9:
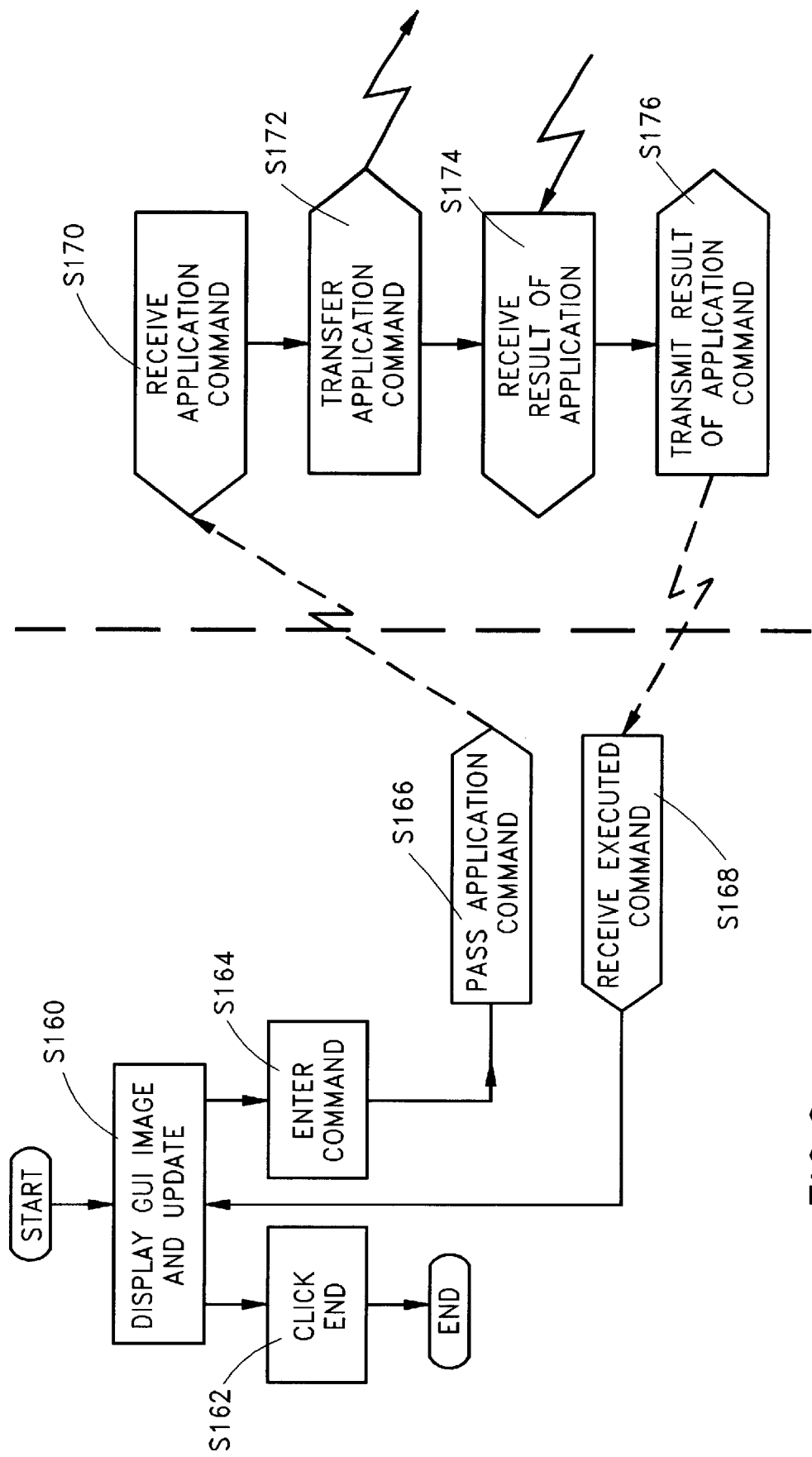
FIG. 9 is a flow chart illustrating operations of the GUIs shown in FIG. 2.

First, with reference to FIGS. 7 to 9, operations executable on the management apparatus 2 will be described. FIG. 7 is a first flow chart illustrating operations of the system management program 220 shown in FIGS. 1 and 2. FIG. 8 is a second flow chart illustrating operations of the system management program 220 shown in FIGS. 1 and 2. FIG. 9 is a flow chart illustrating operations of a given one of the GUIs 228 shown in FIG. 2.

As shown at step 100 (S100) of FIG. 7, when a system administrator designates the organization display function (FIG. 3) via the keyboard 204 or the like, the GUI module 222 accepts the system administrator's action and outputs the same to the database access module 224. In response thereto, the database access module 224 controls the personnel-organization database (PO-DB) 26 to acquire a hierarchical structure of the business organization (organizational structure) using the network system 1, as well as the personnel information data.

Note that the following descriptions with regard to FIGS. 7 to 10 illustrate a case where the management apparatus 2 controls the application management module 322 (FIG. 6) to start either one of the application programs 330 for processing. These descriptions may be applied as well to other cases where a process is executed by using the resources 340 or a setup process therefor is carried.

At step 102 (S102), based on the acquired hierarchical structure and personnel information data, the database access module 224 determines if the subordinate organizations are displayable to the lowest ones (groups) and, if so, it proceeds to S110. Otherwise, it branches to S104.

At step 104 (S104), the database access module 224 uses the acquired hierarchical structure and personnel information data to create an organizational map halfway (e.g., up to the divisions shown in FIG. 3) within the limits of the available information, and displays the map so created on the display device 200 via the 22 GUI module 222.

At step 106 (S106), when a system administrator clicks a lower subordinate organization in the displayed organizational map by using the mouse 206, the database access module 224 returns to S102. At step 110 (S110), the database access module 224 creates an organizational map up to the lowest subordinate organizations, and displays the map so created on the display device 200 via the GUI module 222.

At step 112 (S112), when a system administrator designates (clicks) a subordinate organization other than the lowest ones in the displayed organizational map, at step 114 (S114), the database access module 224 creates organizational information (i.e., general organizational attributes, including organizational codes (organizational numbers), locations, responsible persons (chiefs) of subordinate organizations and the like, in which a system administrator may be interested), and displays it on the display device 200 via the GUI module 222.

At step 120 (S120), when a system administrator designates (clicks) one of the lowest subordinate organizations in the displayed organizational map, at step 122 (S122), the database access module 224 retrieves the system management database (SM-DB) 24 by using, for example, employee numbers of users who belong to the designated lowest subordinate organization as keywords, and acquires device data of the managed devices 3 of these users.

At step 124 (S124), the database access module 224 executes the group display function shown in FIG. 4, and displays the above described icons on the display device 200 via the GUI module 222. Note that, as described with respect to FIG. 4 above, these icons are adapted for displaying users who belong to the designated lowest subordinate organization in association with the managed devices 3 of the users.

At step 126 (S126), when a system administrator designates (clicks) one of the managed devices 3 in the displayed group display screen, at step 128 (S128), the database access module 224 transmits an application list request command to the designated managed device 3 via the network module 226. Note here that in the case of requesting the application list 324 from the designated managed device 3, the database access module 224 uses a network address included in the device data of the managed devices 3 that has been acquired from the system management database 24 at step 122 (S122).

On the other hand, the application management module 322 (FIG. 6) on the designated managed device 3 responds to receipt of the transmission request of the application list 324, and transmits the application list 324 to the management apparatus 2 via the managed program 320. The database access module 224 acquires the application list 324 from the designated managed device 3 via the network module 226.

At step 130 (S130), the database access module 224 uses the acquired application list 324 to display the same on the display device 200 via the GUI module, as shown in FIG. 5.

At step 132 (S132), when a system administrator designates (clicks) one of the application programs in the displayed application list 324, at step 128 (S128), the database access module 224 transmits a start request signal (application start command), which includes an identifier (ID) of the designated application program, to the designated managed device 3 for executing the aforementioned remote control function. On the other hand, the application list 324 on the designated managed device 3 responds to receipt of the application start request from the managed program 320, and starts the requested one of the application programs 330. Further, the application list 324 returns a response signal (application start response, including results of starting, successful or unsuccessful starting of the application program), to the management apparatus 2.

At step 136 (S136), the database access module 224 controls the GUI module 222 for starting a GUI function of a given one of the GUIs 228 adapted for the designated application program. This GUI 228 receives information of the designated managed device 3 (information required for displaying a network address, a system name and the like thereof) from the GUI module 222, and displays a GUI image on the display device 200.

When a system administrator makes an action with respect to the GUI image displayed on the display device 200, this GUI 228 transmits the system administrator's action to the designated managed device 3. In response thereto, the application management program 322 (FIG. 6) cause the started application program to execute an operation that is defined by the action received from the management apparatus 2, and transmits the executed result (executed result response) to the management apparatus 2. This GUI 228 receives the executed result of the application program from the designated managed device 3, and displays the same on the display device 200.

Incidentally, as shown in FIG. 8, when a system administrator clicks a button at any screen for selecting a previous screen in a displayed image on the display device 200, the database access module 224 displays the previous screen on the display device 200 again, and terminates the process in response to depression of a button therefor.

<Operations of GUIs 228>

Here, operations of a given one of the GUIs 228 will be described in more detail in association with operations of the managed program 320. At step 136 (S136) of FIG. 7, when a given one of the GUIs 228 is started, at step 160 (S160) of FIG. 9, this GUI 228 displays a GUI image on the display device 200, and changes the content of the displayed image in response to a system administrator's action.

At step 162 (S162), when a system administrator clicks a terminating button displayed in the GUI image, this GUI 228 requests the managed device 3 to terminate execution of the application program 330. In response thereto, the application management module 322 terminates execution of the application program 330.

At step 164 (S164), a system administrator carries out an action for entering a command with respect to the GUI image. At step 166 (S166), this GUI 228 transmits the entered command (application command) to the managed device 3 via the network module 226. At steps 170 (S170) to step 176 (S176), the application management module 322 receives the command via the network module 326, and then transfers the received command to the started application program. Further, the application management module 322 receives a result of the application program executed in accordance with the command, and then transmits the received result to the management apparatus 2. At step 168 (S168), the involved GUI 228 receives the executed result from the managed device 3, and displays the same on the display device 200.

<Operations of Managed Device 3>

Figure 10:
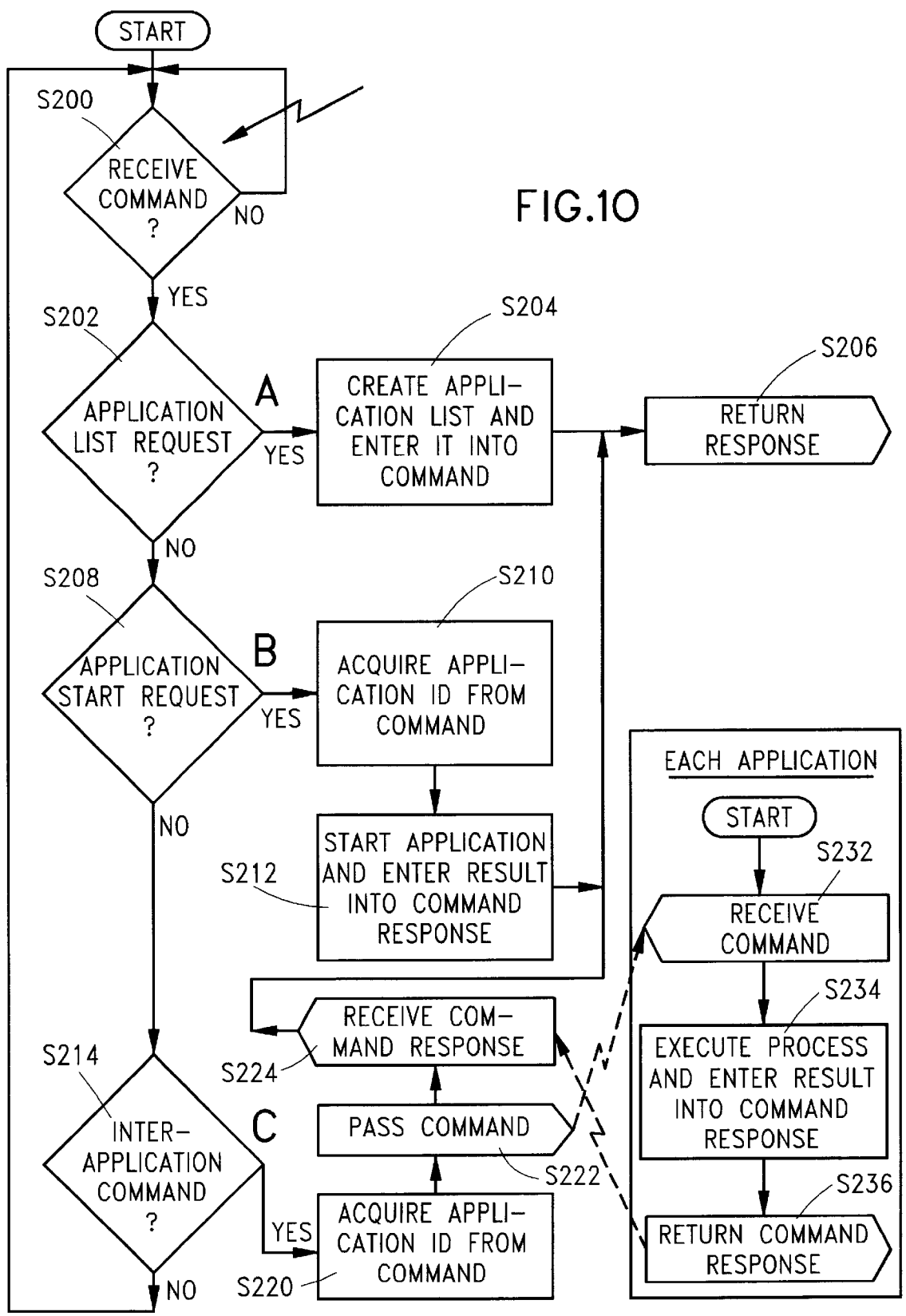
FIG. 10 is a flow chart illustrating a process of the application management module on the managed device.

Now, with reference to FIG. 10, operations executable on a given one of the managed devices 3 will be described. FIG. 10 is a flow chart illustrating a process of the application management module 322 on the managed device 3.

At step 220 (S220) of FIG. 10, the application management module 322 determines if the network module 326 has received a command from the management apparatus 2 or from a given one of the application programs 300 and, if so, it proceeds to S202. At step 202 (S222), the application management module 322 determines if the received command is an application list request command and, if so, proceeds to S204. Otherwise, it branches to S208.

At step 204 (S224), the application management module 322 retrieves the application programs 330 and the resources 340 to create an application list 324, and enters the created list into an application request response. At step 206 (S206), the application management module 322 transmits one of the responses, which is created at one of S212 and S224, to the management apparatus 2 via the network module 326.

At step 208 (S208), the application management module 322 determines if the received command is an application start request command and, if so, it proceeds to S210. At step 210 (S210), the application management module 322 acquires, from the application start request command, an identifier (ID) for specifying either one of the application programs 330.

At step 212 (S212), the application management module 322 starts one of the application programs 330, which is specified by the acquired identifier (ID), and executes the same. Further, the application management module 322 receives executed results from this application program, creates an execution result response, and proceeds to S206.

At step 214 (S214), the application management module 322 determines if the received command is an inter-application command among the application programs 330 and, if so, it proceeds to S220. Otherwise, it returns to S200. At step 220 (S220), the application management module 322 acquires, from the inter-application command, an identifier (ID) for either one of the application programs 330.

At step 222 (S222), the application management module 322 passes the received command to either one of the application programs 330, which is specified by the identifier (ID) acquired from the inter-application command among the application programs 330.

At step 232 (S232) to step 236 (S236), the application program 330 so specified receives the command from the application management module 322, executes a process in accordance with the command, and returns data obtained as a result of the process or a return value as an application start response. At step 224 (S224), the application management module 322 receives the application start response from this application program 330, and proceeds to S206.

As described above, in accordance with the network system 1 of this invention, it is possible to visually display subordinate organizations of users in association with constituents of the network system 1 (the managed devices 3, their application programs 330 and resources 340) on the display device 200. This allows an administrator of the network system 1 to easily recognize a configuration of the network system 1.

Also, in accordance with the network system 1 of this invention, an administrator of the network system 1 is capable of managing start and setup procedures of the application programs 330 and the resources 340 of each managed device 3 from the management apparatus 2 in a centralized manner.

The invention has been described with reference to several specific embodiments, one having skill in the relevant art will recognize that modifications may be made without departing from the spirit and scope of the invention as set forth in the appended claims.

Having thus described our invention, what we claim as new and desire to secure by Letters Patent is:

1. In a network computer system including a plurality of devices associated with one or more users and user groups in a hierarchy of user groups, a system resource display apparatus for displaying resources of each of said managed devices for at least one of said users and user groups, comprising:

an information database for storing hierarchized information data items, each including a keyword data item;

a resource database for storing a plurality of resource data items, each of said resource data items indicating resources of each of said managed devices and said keyword data items in association with each of said resource data items;

hierarchy display means for displaying one or more hierarchical levels of said information data items stored in said information database;

information data display means, being responsive to selection of one of said displayed hierarchical levels, for displaying said information data items included in said selected hierarchical level; and resource data display means, being responsive to selection of one of said displayed information data items, for displaying one of said resource data items that is stored in said resource database in association with one of said keyword data items included in said selected information data item.

2. The system resource display apparatus of claim 1, wherein said managed devices and said system resource display apparatus communicate with each other via a network, further comprising:

setup acceptance means for accepting a change to said displayed resource data item; and setup transmission means for transmitting said accepted change to said displayed resource data item to said designated managed device via said network;

whereby said designated managed device adapts settings of its resources in line with said accepted change to said displayed resource data item received via said network.

3. The system resource display apparatus of claim 1, comprising:

setup acceptance means for accepting a change to said displayed resource data item;

whereby said resource database updates content of said displayed resource data item in line with said accepted change to said displayed resource data item.

4. The system resource display apparatus of claim 1, wherein said information data item indicates an information item of a user of said managed device, said keyword data item indicates a user of said managed device, and said resource data item indicates at least one of a hardware information item and a software information item of said managed device.

5. In a network computer system including a plurality of managed devices, associated with one or more users and user groups in a hierarchy of user groups, and a system resource display apparatus for displaying resources of each of said managed devices, wherein said managed devices and said system resource display apparatus communicate with each other via a network, each of said managed devices having a unique resource data item and a certain keyword data item assigned thereto, and each of said managed devices being responsive to a retrieval operation via said network for returning said assigned resource data item and keyword data item, said system resource display apparatus comprising:

an information database for storing hierarchized information data items, each including said keyword data item;

a resource database for storing resource data information for said managed devices and said keyword data items in association with each of said managed devices;

hierarchy display means for displaying one or more hierarchical levels of said information data items stored in said information database;

information data display means, being responsive to selection of one of said displayed hierarchical levels, for displaying said information data items included in said selected hierarchical level;

managed device display means, being responsive to selection of one of said displayed information data items, for displaying one of said managed devices; and resource data display means, being responsive to selection of one of said managed devices, for communicating with said selected managed device via said network, and for displaying said resource data item returned from said retrieved managed device.

6. The system resource display apparatus of claim 5, further comprising:

setup acceptance means for accepting a change to said displayed resource data item; and setup transmission means for transmitting said accepted change to said displayed resource data item to said designated managed device via said network;

whereby said designated managed device adapts- settings of its resources in line with said accepted change to said displayed resource data item received via said network.

7. The system resource display apparatus of claim 2, wherein said information data item indicates an information item of a user of said managed device, said keyword data item indicates a user of said managed device, and said resource data item indicates at least one of a hardware information item and a software information item of said managed device.

8. In a network computer system including a plurality of managed devices associated with one or more users and user groups in a hierarchy of user groups, a system resource display method for displaying resources of each of said managed devices for at least one of said users or users groups, comprising the steps of:

storing hierarchized information data items, each of said information data items including a keyword data item;

storing resource data items, each indicating resources of each of said managed devices, and storing each of said keyword data items in association with each of said resource data items;

displaying at least one hierarchical level of said information data items;

responding to selection of one of said at least one displayed hierarchical levels by displaying said information data items included in said selected hierarchical level; and responding to selection of one of said displayed information data items by displaying one of said resource data items that is stored in said resource database in association with one of said keyword data items included in said selected information data item.

9. The system resource display method of claim 8, wherein said managed devices and said system resource display apparatus communicate with each other via a network, further comprising the steps of:

accepting a change to said displayed resource data item;

transmitting said accepted change to said displayed resource data item to said selected managed device via said network; and a adapting settings of resources of said selected managed device in line with said accepted change to said displayed resource data item received via said network.

10. The system resource display method of claim 8, further comprising the steps of:

accepting a change to said displayed resource data item; and updating content of said displayed resource data item in line with said accepted change to said displayed resource data item.

11. The system resource display method of claim 8, wherein said information data item indicates an information item of a user of said managed device, said keyword data item indicates a user of said managed device, and said resource data item indicates a hardware information item and/or a software information item of said managed device.

12. In a computer network system resource display apparatus in a system including a plurality of managed devices associated with one or more users or user groups in a hierarchy of user groups, a system resource display method for displaying resources of each of said managed devices, wherein said managed devices and said system resource display apparatus communicate with each other via a network, each of said managed devices having a unique resource data item and a certain keyword data item assigned thereto, and each of said managed devices being responsive to a retrieval operation via said network for returning said assigned resource data item and keyword data item, comprising the steps of:

storing a plurality of information data items arranged in a hierarchy, each including a keyword data item;

storing said managed devices and said keyword data items in association with each of said managed devices;

displaying at least one hierarchical level of said information data items;

responding to selection of one of said displayed at least one hierarchical level by displaying said information data items included in said selected hierarchical level;

responding to selection of one of said displayed information data items by displaying one of said managed devices that is stored in association with one of said keyword data items included in said selected information data item; and responding to selection of one of said displayed managed devices by retrieving said selected managed device via said network, and for displaying said resource data item returned from said retrieved managed device.

13. The system resource display method of claim 12, further comprising the steps of:

accepting a change to said displayed resource data item;

transmitting said accepted change to said displayed resource data item to said selected managed device via said network; and adapting settings of resources of said selected managed device in line with said accepted change to said displayed resource data item received via said network.

14. The system resource display method of claim 12, further comprising the steps of:

accepting a change to said displayed resource data item; and updating content of said displayed resource data item in line with said accepted change to said displayed resource data item.

15. The system resource display method of claim 12, wherein said information data item indicates an information item of a user of said managed device, said keyword data item indicates a user of said managed device, and said resource data item indicates a hardware information item and/or a software information item of said managed device.

16. A machine readable storage medium for storing software adapted for use in system resource display apparatus in a computer network system including a plurality of managed devices associated with one or more users or user groups in a hierarchy of user groups for displaying resources of each of said managed devices, said software being executable by a computer for causing said system resource display apparatus to carry out machine-effected steps of:

storing hierarchized information data items, each of said information data items including a keyword data item;

storing resource data items, each indicating resources of each of said managed devices, and storing each of said keyword data items in association with each of said resource data items;

displaying at least one hierarchical level of said information data items;

responding to selection of one of said at least one displayed hierarchical levels by displaying said information data items included in said selected hierarchical level; and responding to selection of one of said displayed information data items by displaying one of said resource data items that is stored in said resource database in association with one of said keyword data items included in said selected information data item.

17. The machine readable storage medium of claim 16, wherein said managed devices and said system resource display apparatus communicate with each other via a network, wherein each of said managed devices adapts settings of its resources in line with a change to said resource data item accepted via said network, and wherein said software is executable by said computer for causing said system resource display apparatus to carry out additional machine-effected steps of:

accepting a change to said displayed resource data item; and transmitting said accepted change to said displayed resource data item to said selected managed device via said network.

18. The machine readable storage medium of claim 17, wherein said information data item indicates an information item of a user of said managed device, said keyword data item indicates a user of said managed device, and said resource data item indicates at least one of a hardware information item and a software information item of said managed device.

19. The machine readable storage medium of claim 16, wherein said software is executable by said computer for causing said system resource display apparatus to carry out additional machine-effected steps of:

accepting a change to said displayed resource data item; and updating content of said displayed resource data item in line with said accepted change to said displayed resource data item.

20. The machine readable storage medium of claim 19, wherein said information data item indicates an information item of a user of said managed device, said keyword data item indicates a user of said managed device, and said resource data item indicates at least one of a hardware information item and a software information item of said managed device.

21. The machine readable storage medium of claim 16, wherein said information data item indicates an information item of a user of said managed device, said keyword data item indicates a user of said managed device, and said resource data item indicates at least one of a hardware information item and a software information item of said managed device.

22. A machine readable storage medium for storing software adapted for use in a system resource display apparatus in a computer network system including a plurality of managed devices for displaying resources of each of said managed devices associated with one or more users or user groups in a hierarchy of user groups, wherein said managed devices and said system resource display apparatus communicate with each other via a network, each of said managed devices having a unique resource data item and a certain keyword data item assigned thereto, and each of said managed devices being responsive to a retrieval operation via said network for returning said assigned resource data item and keyword data item, said software being executable by a computer for causing said system resource display apparatus to carry out machine-effected steps of:

storing a plurality of information data items arranged in a hierarchy, each including a keyword data item;

storing said managed devices and said keyword data items in association with each of said managed devices;

displaying at least one hierarchical level of said information data items;

responding to selection of one of said displayed at least one hierarchical level by displaying said information data items included in said selected hierarchical level;

responding to selection of one of said displayed information data items by displaying one of said managed devices that is stored in association with one of said keyword data items included in said selected information data item; and responding to selection of one of said displayed managed devices by retrieving said selected managed device via said network, and for displaying said resource data item returned from said retrieved managed device.

23. The machine readable storage medium of claim 22, wherein each of said managed devices adapts settings of its resources in line with a change to said resource data item accepted via said network, and wherein said software is executable by said computer for causing said system resource display apparatus to carry out additional machine-effected steps of:

accepting a change to said displayed resource data item; and transmitting said accepted change to said displayed resource data item to said selected managed device via said network.

24. The machine readable storage medium of claim 23, wherein said information data item indicates an information item of a user of said managed device, said keyword data item indicates a user of said managed device, and said resource data item indicates at least one of a hardware information item and a software information item of said managed device.

25. The machine readable storage medium of claim 22, wherein said software is executable by said computer for causing said system resource display apparatus to carry out additional machine-effected steps of:

accepting a change to said displayed resource data item; and updating content of said displayed resource data item in line with said accepted change to said displayed resource data item.

26. The machine readable storage medium of claim 25, wherein said information data item indicates an information item of a user of said managed device, said keyword data item indicates a user of said managed device, and said resource data item indicates at least one of a hardware information item and a software information item of said managed device.

27. The machine readable storage medium of claim 22, wherein said information data item indicates an information item of a user of said managed device, said keyword data item indicates a user of said managed device, and said resource data item indicates at least one of a hardware information item and a software information item of said managed device.

* * * * *